(12) United States Patent
Ejzak et al.

(10) Patent No.: US 7,586,857 B2
(45) Date of Patent: Sep. 8, 2009

(54) FAST NETWORK SIP/SDP PROCEDURES FOR CONFERENCE OPERATIONS UPON REQUEST FROM END USER WITH OPTIMIZATION OF NETWORK RESOURCES

(75) Inventors: Richard Paul Ejzak, Wheaton, IL (US); Eric Harold Henrikson, Redmond, WA (US); Chung-Zin Liu, Naperville, IL (US); Hong Xie, Downers Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1013 days.

(21) Appl. No.: 10/405,764

(22) Filed: Apr. 1, 2003

(65) Prior Publication Data

US 2004/0196867 A1    Oct. 7, 2004

(51) Int. Cl.
    *H04L 12/16*    (2006.01)
(52) U.S. Cl. ............................... 370/260; 370/352
(58) Field of Classification Search ............... 370/260, 370/261, 262, 352, 356, 354
    See application file for complete search history.

(56) References Cited

U.S. PATENT DOCUMENTS

| | | | |
|---|---|---|---|
| 6,798,755 B2 * | 9/2004 | Lillie et al. | 370/312 |
| 6,816,469 B1 * | 11/2004 | Kung et al. | 370/260 |
| 2004/0003046 A1 * | 1/2004 | Grabelsky et al. | 709/206 |

FOREIGN PATENT DOCUMENTS

| | | |
|---|---|---|
| EP | 1 130 894 | 9/2001 |
| EP | 1 246 442 | 10/2002 |

* cited by examiner

*Primary Examiner*—Jayanti K Patel
*Assistant Examiner*—Dargaye H Churnet

(57) ABSTRACT

The apparatus and method are fast network SIP/SDP (Session Initiation Protocol/Session Description Protocol) procedures for conference operations upon request from end user with optimization of network resources. The apparatus has an SIP/SDP based network controller that, upon a received request, joins first and second calls into a conference call with at least a third call. The SIP/SDP based network controller is structured to negotiate, allocate and re-configure network resources.

18 Claims, 16 Drawing Sheets

FAST NETWORK SIP/SDP PROCEDURES FOR CONFERENCE OPERATIONS UPON REQUEST FROM END USER WITH OPTIMIZATION OF NETWORK RESOURCES

CROSS-REFERENCE TO RELATED APPLICATION

This application contains subject matter that is related to the subject matter of the following applications, which is assigned to the same assignee as this application. The below-listed applications are hereby incorporated herein by reference in its entirety.
"INTERNET PROTOCOL MULTIMEDIA SUBSYSTEM COMPONENT PROVIDING OF PACKET-SWITCHED SWITCHING FUNCTIONS TO SERVING MOBILE SWITCHING CENTER FEATURE SERVER," by Cyr, et al., Ser. No. 10/295,774, filed Nov. 14, 2002; and
"COMMUNICATION BETWEEN USER AGENTS THROUGH EMPLOYMENT OF CODEC FORMAT UNSUPPORTED BY ONE OF THE USER AGENTS," by Ejzak, et al., Ser. No. 10/295,775, filed Nov. 14, 2002.

TECHNICAL FIELD

The invention relates generally to communications and more particularly to wireless communications.

BACKGROUND

Current wireless communication systems provide the ability for users to communicate to and from wireless or mobile users. There are generally two types of wireless communication systems, circuit-switched ("CS") and packet-switched ("PS").

In typical circuit-switched wireless communication systems, the mobile switching center ("MSC") connects the landline public switched telephone network ("PSTN") system to the wireless communication system. The mobile switching center is typically split into an mobile switching center server and a media gateway ("MGW"), and incorporates the bearer independent call control ("BICC") or the integrated services digital network user part ("ISUP") call control protocol for call delivery between mobile switching centers.

The current approach to introducing internet protocol ("IP") multimedia services for universal mobile telecommunications service ("UMTS") and code division multiple access ("CDMA") third generation ("3G") systems is to define a brand new internet protocol multimedia subsystem ("IMS"), comprised of a set of internet protocol connected network entities within the internet protocol multimedia subsystem using packet-switched services. These network entities provide internet protocol multimedia features and services using the session initiation protocol ("SIP") as the primary vehicle for call control.

As the network entities become more centralized and employ disparate codecs to communicate, the difficulty involved in allowing end users to communicate increases. It is desirable to enable the negotiation of codecs between remote network resources and end users to optimally configure a conference call.

Wireless service operators are looking for efficient solutions to: 1) utilize the packet transport for circuit voices in the backbone core network; and 2) be able to negotiate and modify codecs to facilitate both Transcoder Free Operation (TrFO) and Remote Transcoder Operation (RTO) over packet networks. The TrFO and RTO bring the benefits of voice quality improvement, saving of transport facility and reduction of network resources.

In the existing wireless circuit network, conferencing operation is a value-added service. While evolving the TDM based transport to packet-based network, it is highly desirable to find a solution that supports fast setup of a conference bridge that models an existing circuit conference operation, minimizes usage of network resource and maintains good voice quality. The solution should also support SIP enabled packet mobiles with end-to-end VoIP applications.

Thus there is a need in the prior art for fast network SIP/SDP (Session Initiation Protocol/Session Description Protocol) procedures for conference operations upon request from end user with optimization of network resources.

SUMMARY

The invention in one implementation encompasses an apparatus. The apparatus has an SIP/SDP (Session Initiation Protocol/Session Description Protocol) based network controller that, upon a received request, joins first and second calls into a conference call with at least a third call. The SIP/SDP based network controller is structured to negotiate, allocate and re-configure network resources.

The invention in another implementation encompasses an apparatus. The apparatus has a network controller that, upon a request from a first user that is on an active call, the first user having at least one on-hold call with at least a second user, joins at least the first and second users in a conference call with at least a third user. A media resource function controller is operatively connected to the network controller via an open interface with SIP/SDP (Session Initiation Protocol/Session Description Protocol) signaling that allows the network resource controller to independently perform at least codec renegotiation and bearer re-configuration for each call leg between users.

Another implementation of the invention encompasses a method. The method has the steps of placing on-hold a call between a first user and at least a second user, wherein the first user is on an active call, wherein the at least the second user is on an on-hold call; sending a request for a conference call, with at least a third user, from the first user to a network controller via an open interface with SIP/SDP signaling; and communicating between the network controller and a media resource function controller via an open interface with SIP/SDP signaling to allow the network resource controller to independently perform at least codec renegotiation and bearer re-configuration for each call leg between users.

DESCRIPTION OF THE DRAWINGS

The features of the present invention, which are believed to be novel, are set forth with particularity in the appended claims. The invention may best be understood by reference to the following descriptions taken in conjunction with the accompanying drawings, in the several figures of which like reference numerals identify like elements.

DETAILED DESCRIPTION

As the service providers evolve the existing TDM based network to packet-based network, there is a need to maintain service continuity for their customers. The various embodiments of the present apparatus and method provide a conferencing solution that uses IP based SIP network architecture and SIP/SDP signaling for network controlled conferencing over packet network. The network-controlled conferencing is most desirable for wireless users due to the scarce resource over the air interface. The solution is also applicable for SIP enabled end users.

In general this is a SIP/SDP based solution that enables the network controller, upon request from the end user, to perform the following conference operations: joining two existing calls (one on hold, one active) into a conference call; and clearing a conference call and resume two-way conversation.

It allows the network controller (i.e., a SIP back-to-back User Agent—a B2BUA) to negotiate, allocate and re-configure network resources (e.g. conference bridge and voice transcoders) that are controlled by a SIP User Agent. The design optimizes operation parallelism amongst all participating parties to allow fast call setup. It complies with standard SIP/SDP procedures and may be easily extended to support other typical conference operations, such as to add another party, to drop a party from the conference call, etc.

Figure 1:
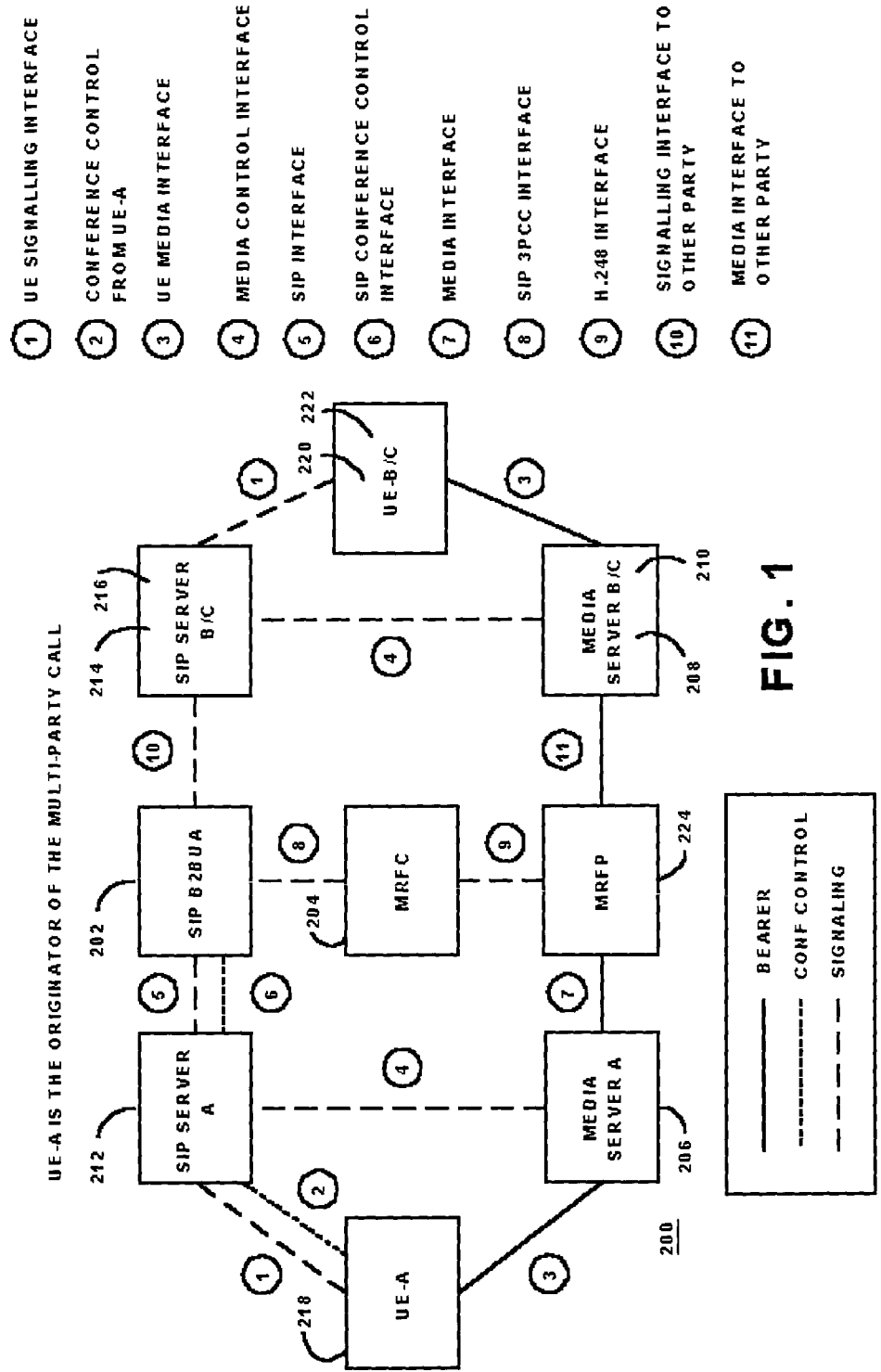
FIG. 1 is a representation of one exemplary configuration of an apparatus that implements call conferencing.

Turning to FIG. 1, the exemplary configuration depicts a communication network 200 that provides a conferencing feature. In one example, the communication network 200 is part of an internet protocol multimedia subsystem ("IMS"). The communication network 200 in one example comprises one or more network controllers 202, one or more resource controllers 204, one or more media servers 206, 208, and 210 and one or more SIP servers 212, 214, and 216 for one or more respective end users UE-A 218, UE-B 220, and UE-C 222, and one or more network resources 224. The network controller 202 comprises a SIP back-to-back user agent ("SIP B2BUA"), for example, an application server ("AS") within the 3GPP IP Multimedia Subsystem (IMS). The resource controller 204 in one example comprises a SIP user agent, for example, the media resource function controller 112 (FIG. 1). The resource controller 204 may be physically located anywhere within the network and serve multiple geographically distributed network controllers 202. The network controller 202 may use provisioned or discovered information on the availability of resource controllers 204 to optimize allocation of network resources 224. The media servers 206, 208, and 210 in one example comprises a media gateway 118 (FIG. 1). The SIP servers 212, 214, 216 in one example comprise a serving mobile switching center server, 3GPP IMS CSCF, 3GPP IMS MGCF, or SIP proxy server. The one or more network resources 224 in one example comprise media resource function processors 116 (FIG. 1).

The end users 218, 220, and 222 employ the communication links 1 to communicate call control information with the SIP servers 212, 214, and 216, respectively. The communication link 1 in one example supports a call control protocol to exchange the call control information between the end user 218 and the SIP server 212, for example, session initiation protocol, bearer independent call control ("BICC"), integrated services digital network user part ("ISUP"), or an air-interface circuit call control protocol for CDMA or UMTS. UE-A 218 employs conference control interface 2 to control conference features. UE-A 218 may employ any appropriate protocol for conference control interface 2, including the call control protocol used for communication link 1. The end users 218, 220, and 222 employ the communication links 3 to send and receive the media associated with the conference call.

The SIP servers 212, 214, and 216 control the media servers 206, 208, and 210, respectively, through the communication link 4. In one example, the SIP servers 212, 214, and 216 employ an H.248 protocol to control the respective media servers 206, 208, and 210. The communication links 5 and 10 provide a path for call control information between the SIP servers 212, 214, and 216 and the network controller 202. The communication link 5 in one example employs a session initiation protocol to exchange call control information. In a further example, the SIP server 212 translates the call control information between the protocols employed by the corresponding communication link 1 and the communication link 5. Similarly, the SIP servers 214 and 216 translate the call control information between the protocols employed by the corresponding communication link 1 and the communication link 10. The SIP server 212 also translates as necessary between the protocols employed on the conference control interface 2 and the conference control interface 6. Conference control interface 6 in one example employs the SIP INFO method to communicate conference control information. Communication link 8 in one example provides a path for resource control information between the network controller 202 and the resource controller 204. In one example, the network controller 202 employs a session description protocol within SIP to exchange the resource control information over the communication link 8 using third party call control procedures. The resource controller 204 in one example employs an H.248 interface 9 to communicate with the network resources 224. The media of the conference call is communicated over the bearer path provided by communication paths 3, 7, and 11. The media servers 206, 208, and 210 and the network resources 224 provide media translations between the respective users end user 218, end user 220, and end user 222.

The following is an overall description of the conference allocation procedure. An end user, such as user UE-A 218, has two calls established using the call control protocol of communication link 1; one call is active and the other call is on hold. The end user signals the network using interface 2 to join the two calls into a conference call. The request and corresponding parameters are sent to the network controller 202. In one example, the request and corresponding parameters are sent within a SIP INFO message. Upon receiving the request, the network controller 202 may check a subscription database for authorization of the service, and proceed to set up the network resources 224. The network controller 202 maintains the previous call information, such as end-point codec capabilities and call Identifications. The network controller 202 sends SIP INVITE without SDP attachment to the resource controller 204 to request a conference media resource 224 and to allow separate session capability negotiation with each participating party. When the network conference resource 224 is allocated, the network controller 202 sends SIP UPDATE to each end user simultaneously, including the send/receive IP address, port number, and codec information for the corresponding conference port on network resource 224, to initiate SDP offer/answer negotiation to optimally re-configure the bearer resources. Upon completion of the SDP offer/answer procedure within the SIP UPDATE transaction to optimally allocate network resources for each leg of the conference bridge, the network controller 202 sends the remote media endpoint information within SDP to the resource controller 204 so that it can complete the configuration of the network resource 224. The conference call is now established.

The network controller 202, resource controller 204, and the end users 218, 220, and 222 in one example are geographically distant. Through employment of the session initiation protocol over the communication link 8, the network controller 202 can communicate with one or more remote resource controllers 204 to optimally allocate the one or more network resources 224 necessary for the conference call.

Figure 2:
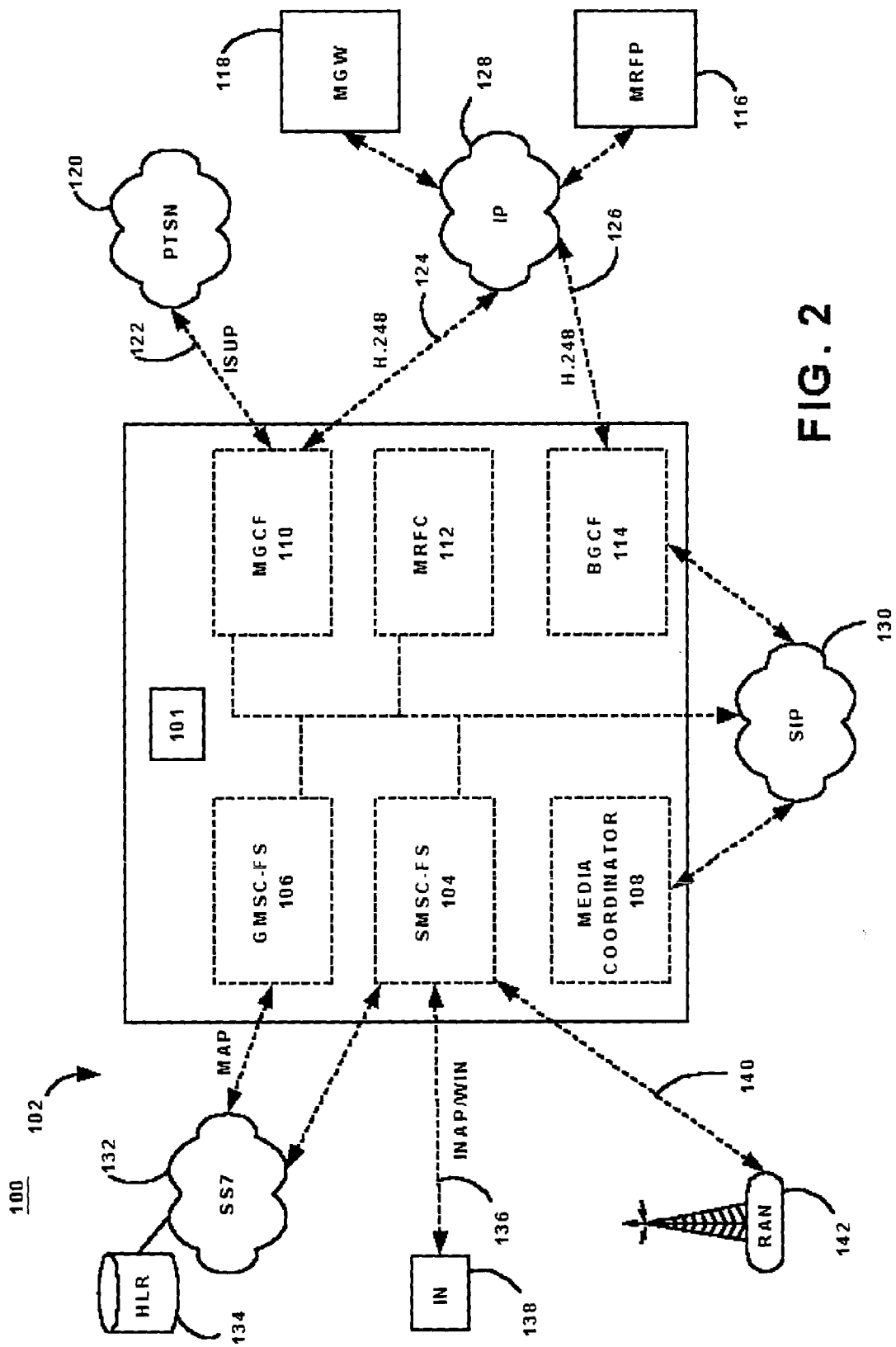
FIG. 2 is a representation of one example of an apparatus that comprises one or more mobile switching center service components and one or more internet protocol multimedia subsystem components.

Turning to FIG. 2, an apparatus 100 in one example comprises a plurality of components such as computer software and/or hardware components. A number of such components can be combined or divided in the apparatus 100.

In one example, the apparatus 100 employs one or more computer-readable signal-bearing media. One example of a computer-readable signal-bearing medium for the apparatus 100 comprises an instance of a recordable data storage medium 101 such as one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the Internet, and a wireless network. An exemplary component of the apparatus 100 employs and/or comprises a set and/or series of computer instructions written in or implemented with any of a number of programming languages, as will be appreciated by those skilled in the art.

In one example, the apparatus 100 comprises a mobile switching center ("MSC") 102. The mobile switching center 102 comprises one or more mobile switching center service components and one or more internet protocol multimedia subsystem ("IMS") components. The one or more internet protocol multimedia subsystem components provide a packet-switched switching function to the one or more mobile switching center service components. The one or more internet protocol multimedia subsystem components provide session initiation protocol ("SIP") based call signaling, call routing, signaling interworking, and media processing services to the one or more mobile switching center service components. The one or more mobile switching center service components and the one or more internet protocol multimedia subsystem components comprise a network for communication between endpoints. A wireless portion of the network may communicate via a cellular system protocol, for example, code division multiple access ("CDMA"), global system for mobile communications ("GSM"), or universal mobile telecommunications system ("UMTS"). The one or more mobile switching centers service components and the one or more internet protocol multimedia subsystem components may be within the same mobile switching center 102 or distributed between a plurality of instances of the mobile switching center 102.

The one or more mobile switching center service components comprise a serving mobile switching center feature server ("SMSC-FS") 104, a gateway mobile switching center feature server ("GMSC-FS") 106, and a media coordinator ("MC") 108. The one or more internet protocol multimedia subsystem components comprise a media gateway control function ("MGCF") 110, a media resource function controller ("MRFC") 112, a breakout gateway control function ("BGCF") 114, a media resource function processor ("MRFP") 116, and a media gateway ("MGW") 118.

The serving mobile switching center feature server 104 provides the mobile switching center 102 with functions of a serving mobile switching center with the exception of the functions provided by the one or more internet protocol multimedia subsystem components and the media coordinator 108. The serving mobile switching center feature server 104 supports mobility management, subscriber feature control, call-related supplementary services, originating intelligent network ("IN") triggers, digit analysis, emergency service, charging, and media coordinator interface.

In one example, the serving mobile switching center feature server 104 comprises a session initiation protocol user agent ("UA"). The serving mobile switching center feature server 104 supports session initiation protocol call control procedures. The session initiation protocol call control procedures comprise session initiation protocol based call signaling, call routing, signaling interworking, and media processing. Additional instances of the serving mobile switching center feature server 104 may support other call control protocols such as bearer independent call control ("BICC") or integrated services digital network user part ("ISUP"). The mobile switching center 102 may employ the additional instances of the serving mobile switching center feature server 104 to support a plurality of call control protocols.

The serving mobile switching center feature server 104 provides interworking between internal origination and termination call features and services, and an external session initiation protocol interface to the media coordinator 108. The external session initiation protocol interface supports communication of mobile-originated and mobile-terminated calls between the serving mobile switching center feature server 104 and the remainder of the network. The external session initiation protocol interface also supports communication of media requests for tones, announcements, or conferencing between the serving mobile switching center feature server 104 and the media coordinator 108. The communication of media requests between the serving mobile switching center feature server 104 and the media coordinator 108 requires the definition of additional session initiation protocol headers or attachments in some cases. Unlike the session initiation protocol interfaces between other entities in the mobile switching center 102, the external session initiation protocol interface between the serving mobile switching center feature server 104 and the media coordinator 108 will typically remain private to a single vendor, allowing the use of private session initiation protocol extensions using the X-header mechanism defined by the internet engineering task force ("IETF").

The gateway mobile switching center feature server 106 provides the mobile switching center 102 with services of a gateway mobile switching center through session initiation protocol call control procedures. In one example, the gateway mobile switching center feature server 106 comprises a session initiation protocol back-to-back user agent ("B2BUA").

The gateway mobile switching center feature server 106 supports session initiation protocol call control procedures. Additional instances of the gateway mobile switching center feature server 106 may support other call control protocols such as bearer independent call control or integrated services digital network user part. The mobile switching center 102 may employ the additional instances of the gateway mobile switching center feature server 106 to support a plurality of call control protocols.

The gateway mobile switching center feature server 106 supports terminating services, basic intersystem call delivery, terminating intelligent network triggers, secondary treatment, and charging. In one example, the gateway mobile switching center feature server 106 delivers call progress or service control indications to the calling party as out-of-band call progress information using session initiation protocol. The originating point in the network (i.e., the serving mobile switching center feature server 104, the media coordinator 108, or the media gateway control function 110) converts the out-of-band call progress information to in-band call progress information. The call progress and service control indications are typically carried via existing session initiation protocol messages and headers, although additional session initiation protocol headers or attachments may be needed in some cases.

In one example, the media coordinator 108 comprises a session initiation protocol back-to-back user agent between the serving mobile switching center feature server 104 and the network. For mobile telephone originated calls, the media coordinator 108 supports propagation of basic call state information between the serving mobile switching center feature server 104 and the network. The media coordinator 108 supports conversion of out-of-band call progress or call-release information from the network to in-band call progress information toward the mobile telephone by allocation of resources of the media resource function controller 112 and the media resource function processor 116. The media coordinator 108 supports media negotiation between end-points in the network through allocation of resources of the media resource function controller 112 and the media resource function processor 116 as needed for media conversion. The media coordinator 108 supports control of forward cut-through of media when call is answered within the network. The media coordinator 108 supports session initiation protocol third party call control procedures to perform media functions under direction of the serving mobile switching center feature server 104. The media functions comprise allocation of resources of the media resource function controller 112 and the media resource function processor 116 as needed to control conferencing, tones, announcements, or inter-system handoff.

For calls terminated at the mobile telephone, the media coordinator 108 supports propagation of basic call state information between the serving mobile switching center feature server 104 and the network. The media coordinator 108 supports media negotiation between end-points in the network through allocation of resources of the media resource function controller 112 and the media resource function processor 116 as needed for media conversion. The media coordinator 108 supports session initiation protocol third party call control procedures to perform media functions under direction of the serving mobile switching center feature server 104. The media functions include allocation of resources of the media resource function controller 112 and the media resource function processor 116 as needed to control conferencing, tones, announcements, or inter-system handoff.

The media gateway control function 110 serves as a call control interface and translator between the mobile switching center 102 and a public switched telephone network ("PSTN") 120 or another network. In one example, the media gateway control function 110 comprises a session initiation protocol user agent ("UA") for the mobile switching center 102. For example, the media gateway control function 110 converts between session initiation protocol call control messages of the mobile switching center 102 and bearer independent call control or integrated services digital network user part call control messages of the public switched telephone network 120. The media gateway control function 110 communicates with the public switched telephone network 120 via a communication link, for example, a bearer independent call control or integrated services digital network user part interface 122.

In one example, the media gateway control function 110 controls the media gateway 118. The media gateway control function 110 comprises a signaling layer controller and the media gateway 118 comprises a media layer controller. The media gateway control function 110 provides connection control for media channels in the media layer controlled by the media gateway 118. The media gateway control function 110 controls the media gateway 118 via a communication link, for example, a H.248 interface 124 through an internet protocol network 128.

In another example, the media gateway control function 110 controls a plurality of the media gateways 118. The media gateway control function 110 controls the plurality of media gateways 118 via one or more communication links, for example, one or more instances of the H.248 interface 124 to the internet protocol network 128. The plurality of the media gateways 118 register with the media gateway control function 110. After registration with the media gateway control function 110 the plurality of media gateways 118 can begin bearer processing. The media gateway control function 110 controls establishment of bearer resources for communications that require inter-working between the mobile switching center 102 and the public switched telephone network 120. The media gateway control function 110 requests allocation of ports for communications that require services of the media gateway 118.

The media gateway control function 110 uses the H.248 interface 124 to the internet protocol network 128 to signal the media gateway 118 to execute one or more media operations. The one or more media operations comprise registration of the media gateway 118, bearer establishment control between the mobile switching center 102 and the public switched telephone network 120, request for allocation of media translation resources (i.e., compression, echo cancellation, and vocoding), control of events detected at the media gateway 118, application of tones and announcements, and collection of statistics.

The media gateway control function 110 uses a session initiation protocol network 130 to accept commands from other signaling entities in the network. The media gateway control function 110 performs functions related to control of a call. The media gateway control function 110 provides for negotiation of media attributes with other end-points in the network. For calls originating in the public switched telephone network 120 and entering the mobile switching center 102, the media gateway control function 110 provides for conversion of out-of-band call progress information into in-band call progress information. The out-of-band call progress information comprises a signaling message that is not heard by a user during communication. The in-band call progress information comprises a signaling message that is heard by the user during communication. For example, the media gateway control function 110 provides for conversion of an out-of-band ringing indication to an in-band ringing tone. In another example, the media gateway control function 110 provides for conversion of an out-of-band network error indication (i.e., a session initiation protocol server internal error response message) to an in-band network error signal (i.e., a fast busy indication).

The media resource function controller 112 provides control of packet-based media services (i.e., advanced announcement generation and detection), conferencing, tone and announcement generation, future advanced media services (i.e., video mixing), transcoding, and interactive voice response. The media resource function controller 112 controls the media resource function processor 116 via a communication link, for example, a H.248 interface 126 through the internet protocol network 128. By controlling the media resource function processor 116, the media resource function controller 112 controls use of vocoders, transcoders, compression entities, bearer-stream mixers, and echo cancellers. The vocoders are needed to transcode between media streams using different media encoding formats (e.g. selectable mode vocoder "SMV", enhanced variable rate codec "EVRC", and G.711). The media resource function controller 112 supports real time protocol, user datagram protocol, and internet protocol ("RTP/UDP/IP") as a transport protocol stack for packet media.

The breakout gateway control function 114 comprises a signaling entity for call/session control. In one example, the breakout gateway control function 114 comprises a session initiation protocol proxy server for the mobile switching center 102. In another example, the breakout gateway control function 114 comprises a session initiation protocol redirect server or session initiation protocol back-to-back user agent. The breakout gateway control function 114 selects the media gateway control function 110 to couple the mobile switching center 102 with the public switched telephone network 120. A call from a wireless telephone to a telephone in the public switched telephone network 120 comprises a signaling message. The signaling message comprises connection information of an address (i.e., an E.164 address) of the telephone in the public switched telephone network 120. The breakout gateway control function 114 employs the E.164 address to locate an internet protocol network destination address of the call. In one example, the breakout gateway control function 114 references an address translation table to find the internet protocol network destination address corresponding to the E.164 address. The address translation table may include other information needed to establish communication between the breakout gateway control function 114 and the next hop destination for the signaling message, including port number, transport protocol, and security parameters. The breakout gateway control function 114 sends the signaling message to the destination address.

The breakout gateway control function 114 may use information from a plurality of sources to determine the destination address. The plurality of sources comprise the point of origination of the call within the network, location of the E.164 address, local policies and business agreements between the visited and home networks, desire to minimize path distance within the public switched telephone network 120 network, and a desire for the least-cost path.

The breakout gateway control function 114 performs selection of the media gateway control function 110 based on the destination address, hiding of network information from other networks, and provision of security through authorization of peer network elements. When a first breakout gateway control function 114 exists in a first network, a second breakout gateway control function 114 exists in a second network, and the networks are coupled, then the first and the second breakout gateway control functions 114 may hide local network information from the other network.

The media gateway 118 translates between a media flow (e.g., audio) on a given internet protocol network and bearer data on the public switched telephone network 120. The media gateway 118 terminates circuit-switched ("CS") bearer traffic from the public switched telephone network 120 and terminates internet protocol media flow as packet streams from another end-point in the mobile switching center 102. In one example, other end-point comprises the media gateway control function 110 or a media end-point associated with the serving mobile switching center feature server 104. The media gateway 118 performs vocoding and provides tones and announcements. The media gateway 118 comprises resources to modify a bearer stream (i.e., encoding, compression, echo cancellation, packetization, transcoding, packet timing synchronization, and packet loss handling).

The media gateway 118 supports one or more types of voice encoding (i.e., codec formats). The one or more types of voice encoding comprise G.711, enhanced variable-rate codec ("EVRC"), adaptive multi-rate ("AMR"). The media gateway 118 is able to use the G.711 codec format to encode and decode voice on trunks connected to the public switched telephone network 120.

The media gateway 118 comprises resources to support a plurality of signaling mechanisms, for example, registration with the media gateway control function 110, detection of events (e.g., dual-tone multi-frequency ("DTMF") detection), application of tones and announcements to bearer streams, graceful teardown and random restart, notification, generation of statistics, and support of H.248 packages. The media gateway 118 organizes bearer connections using H.248 contexts containing terminations. The media gateway 118 may include numerous simultaneous contexts.

The mobile switching center 102 comprises one or more interfaces with communication support entities in the network external to the mobile switching center 102. The mobile switching center 102 comprises a signaling system seven ("SS7") interface 132 to a home location register ("HLR") 134. The home location register 134 comprises a database that stores registration information for a user of the network. The mobile switching center 102 comprises an intelligent network application protocol ("INAP") or wireless intelligent network ("WIN") interface 136 to an intelligent network ("IN") 138. The intelligent network 138 provides the mobile switching center 102 access to one or more telephony services, for example, number translation, local number portability ("LNP"), call forwarding, call screening, and wireless integration. The mobile switching center 102 comprises an interface 140 to an radio access network ("RAN") 142. The radio access network 142 comprises an interface between the mobile telephone and the network (i.e., the mobile switching center 102). The radio access network 142 may comprise a code division multiple access radio access network, a universal mobile telecommunications system terrestrial radio access network ("UTRAN"), or a global system for mobile communications/enhanced data rates for global evolution radio access network ("GERAN"). The radio access network 142 is coupled to the mobile telephone via an air interface, for example, a third generation ("3G") air interface. The radio access network 142 may employ an instance of the media gateway 118 to convert the air interface media flow into a packet stream.

Figure 3:
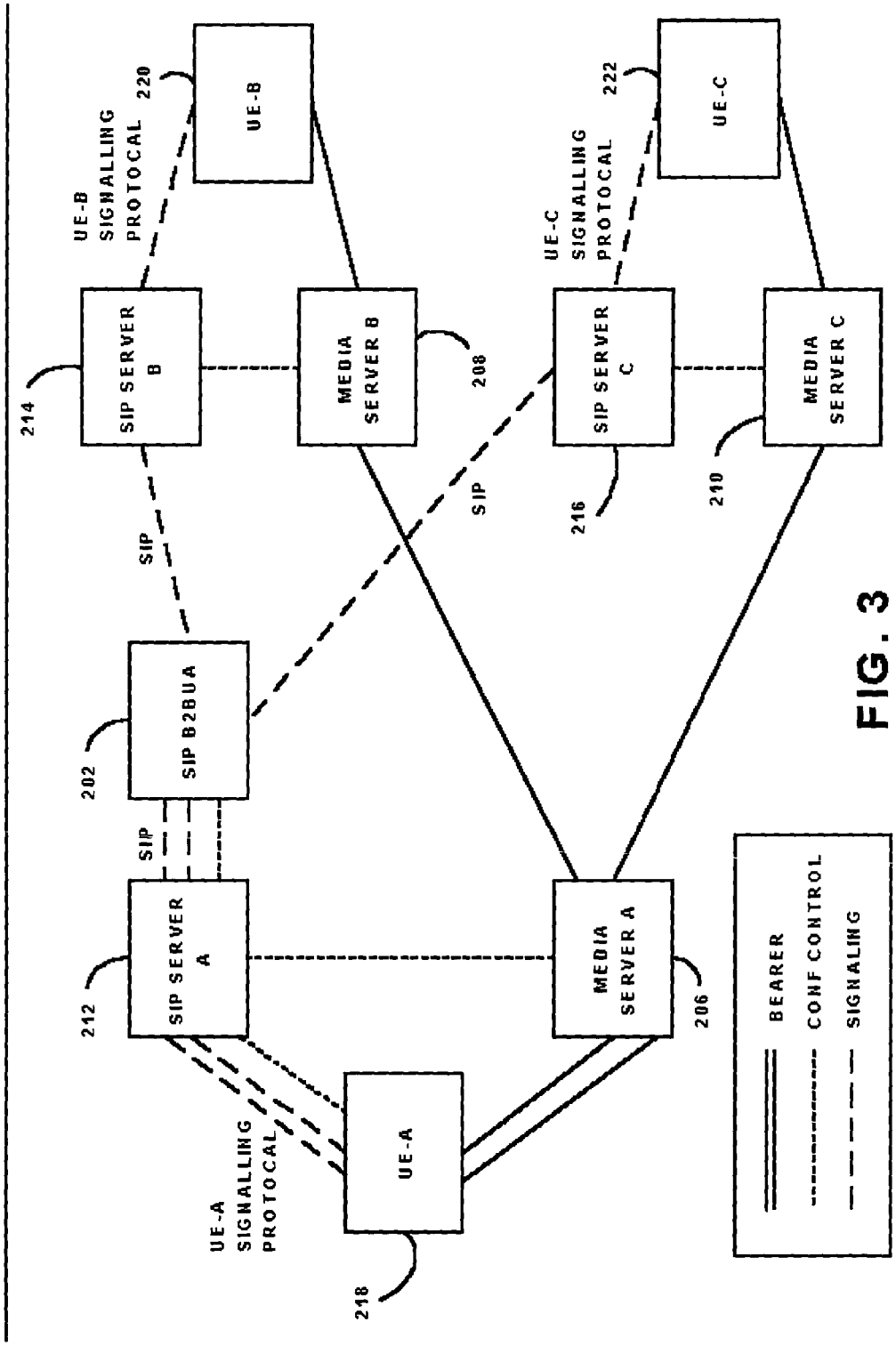
FIG. 3 is a representation of one exemplary configuration of an apparatus that implements pre-conferencing.

Referring now to FIG. 3, the exemplary configuration of the FIG. 2 communication network depicts a pre-conferencing configuration. The user UE-A 218 has established two separate media sessions (calls) with UE-B 220 and UE-C 222, respectfully. The user UE-A 218 may now originate a conference (multi-party) call. Media gateway 206 is operatively connected to media servers 208 and 210. The SIP servers 212, 214, and 216 are operatively connected to the network controller 202. The users UE-A 218, UE-B 220, and UE-C 222 are respectively connected to SIP servers 212, 214, and 216, and media gateways 206, 208, and 210, as depicted in FIG. 3. The users UE-A 218, UE-B 220, and UE-C 222 may be mobile users, PSTN users, or native SIP endpoints.

Figure 4:
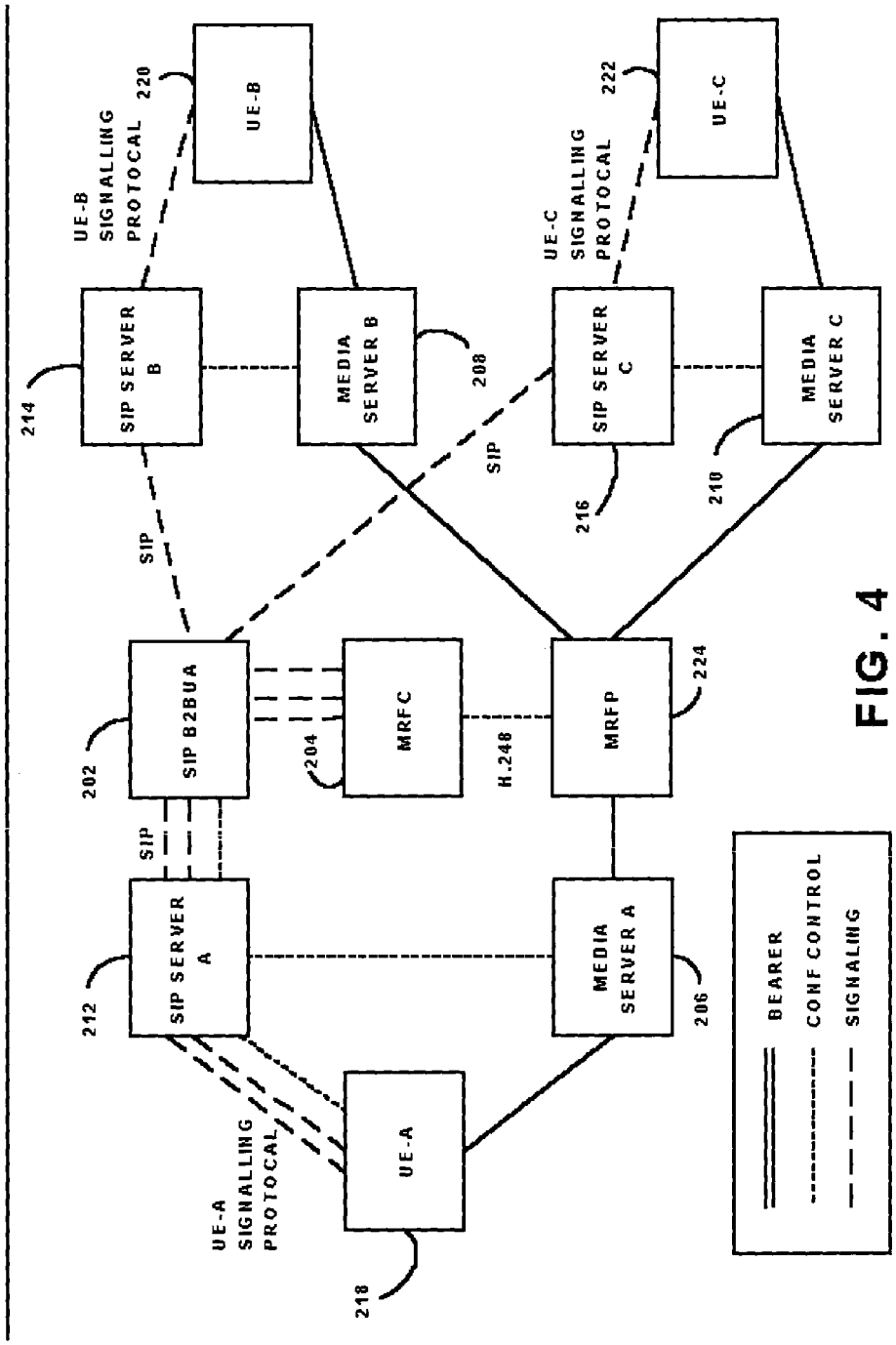
FIG. 4 is a representation of one exemplary configuration of an apparatus that implements call conferencing.

Referring now to FIG. 4, exemplary configuration of the FIG. 3 communication network depicts a conferencing configuration. The end users UE-A 218, UE-B 220, and UE-C 222 exchange call control information with the network controller 202 through SIP server 212, SIP server 214, and SIP server 216, respectively. The user UE-A 218 is the originator of the conference (multi-party) call. Media server 206 is operatively connected to media servers 208 and 210 via the network resources 224. The network controller 202 is operatively connected to the resource controller 204, which is operatively connected to the network resources 224. Network controller 202 performs SIP third party call control procedures to allocate an appropriate network conference resource 224 via resource controller 204, and to allocate bearer resources between all endpoints 206, 108, 210 and 224 in an optimal fashion.

Figure 5:
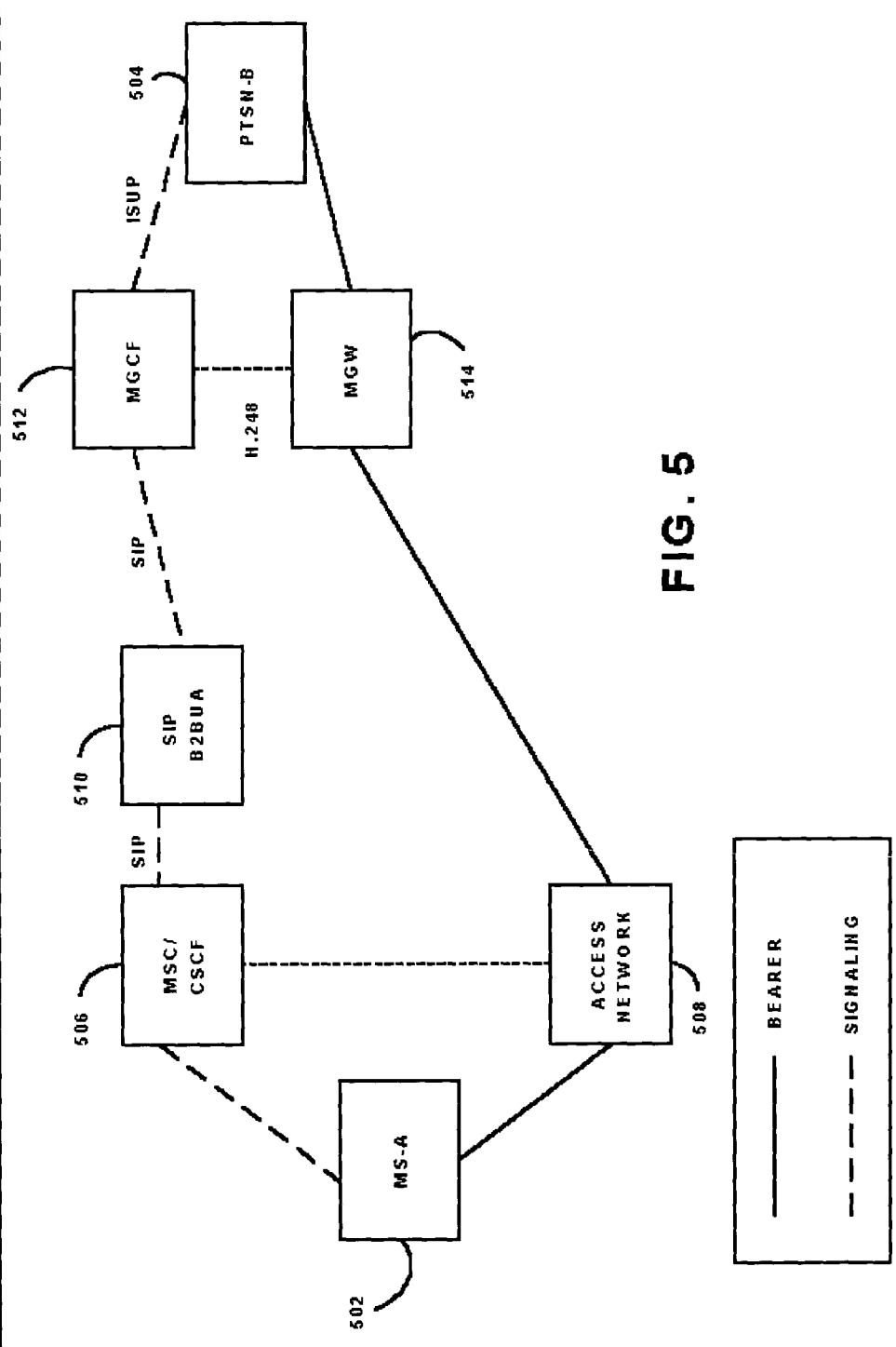
FIGS. 5-7 is a representation of another exemplary configuration of an apparatus that implements one example of a conference call scenario.
Figure 6:
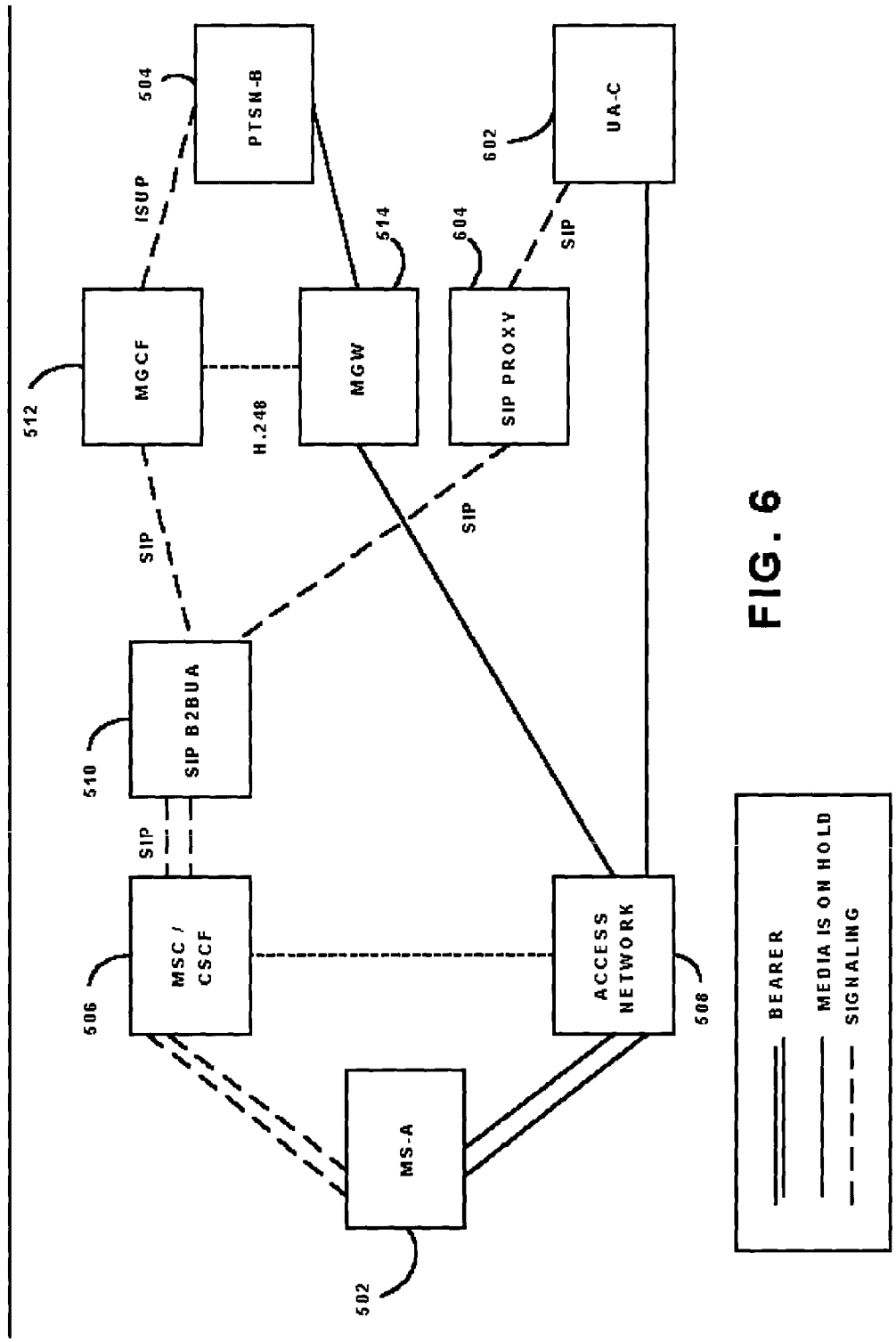
Figure 7:
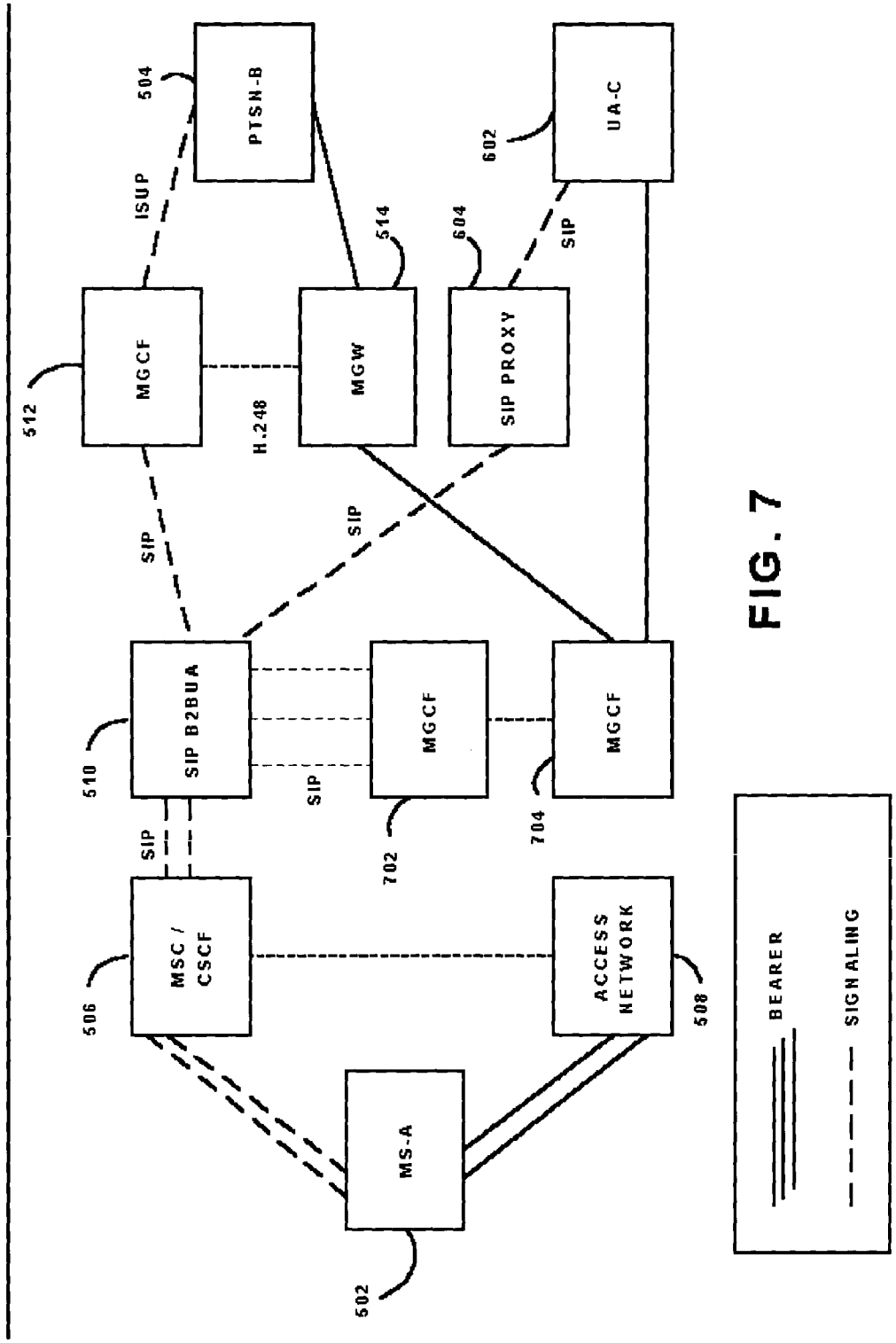

Referring now to FIGS. 5-7, exemplary configurations depict a conference call scenario in a communication network that provides a conferencing feature. In FIG. 5 a user MS-A 502 has one call set up to user PSTN-B 504 in a conference call pre-condition. The access network 508 in one example comprises the media server 206 (FIG. 2). The MSC/CSCF 506 in one example comprises the SIP server 212 (FIG. 2). The SIP B2BUA 510 comprises the network controller 202 (FIG. 2). The MGCF 512 in one example comprises the SIP server 214 (FIG. 2). The MGW 514 in one example comprises the media server 208 (FIG. 2).

In FIG. 6 the call between the user MS-A 502 and a user PSTN-B 504 has been placed on hold, and a call between the user MS-A 502 and a user UA-C 602 has been established. The user UA-C 602 in one example comprises the UE-C 222 (FIG. 2). The SIP proxy 604 in one example comprises the media server 210 (FIG. 2). The user MS-A 502 has requested to build a conference call to join the existing call with the call on hold.

In FIG. 7 the signaling and bearer paths are depicted for the established conference call. The user MS-A 502 signals a request to network controller 510 to begin the conference call setup with call identification for users PSTN-B 504 and UA-C 602. In one example, the end users 504 and 602 comprise PSTN users or SIP wireline users. The network controller 510 then signals the resource controller 702 to seize a conference bridge 704 with three ports. The resource controller 702 in one example comprises the resource controller 204 (FIG. 2). The conference bridge 704 in one example comprises the network resources 224 (FIG. 2). The network controller 510 updates the network to re-configure the bearer path as depicted in FIG. 7.

Figure 8:
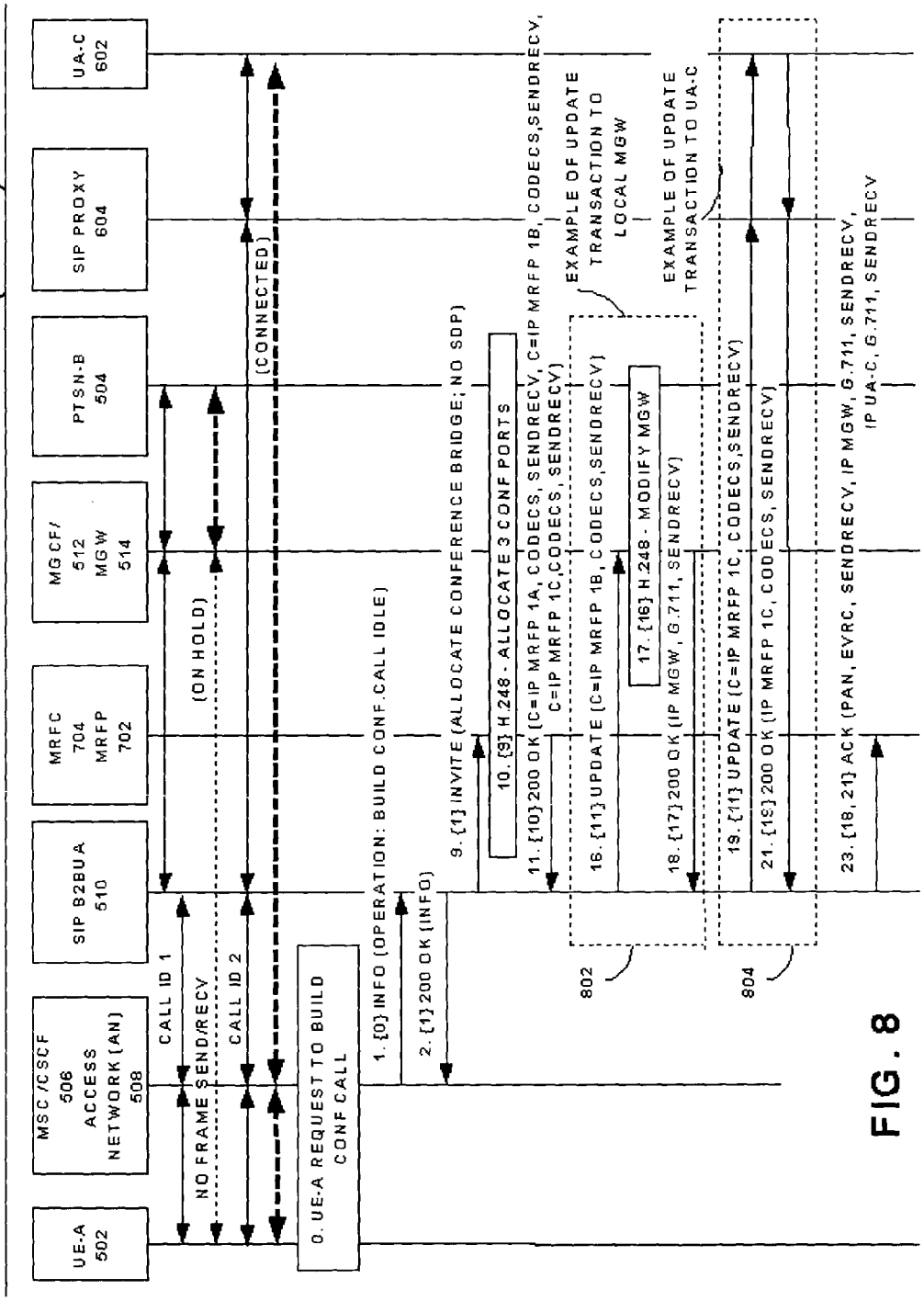
FIGS. 8-9 is another representation of one exemplary conference call setup operation.
Figure 9:
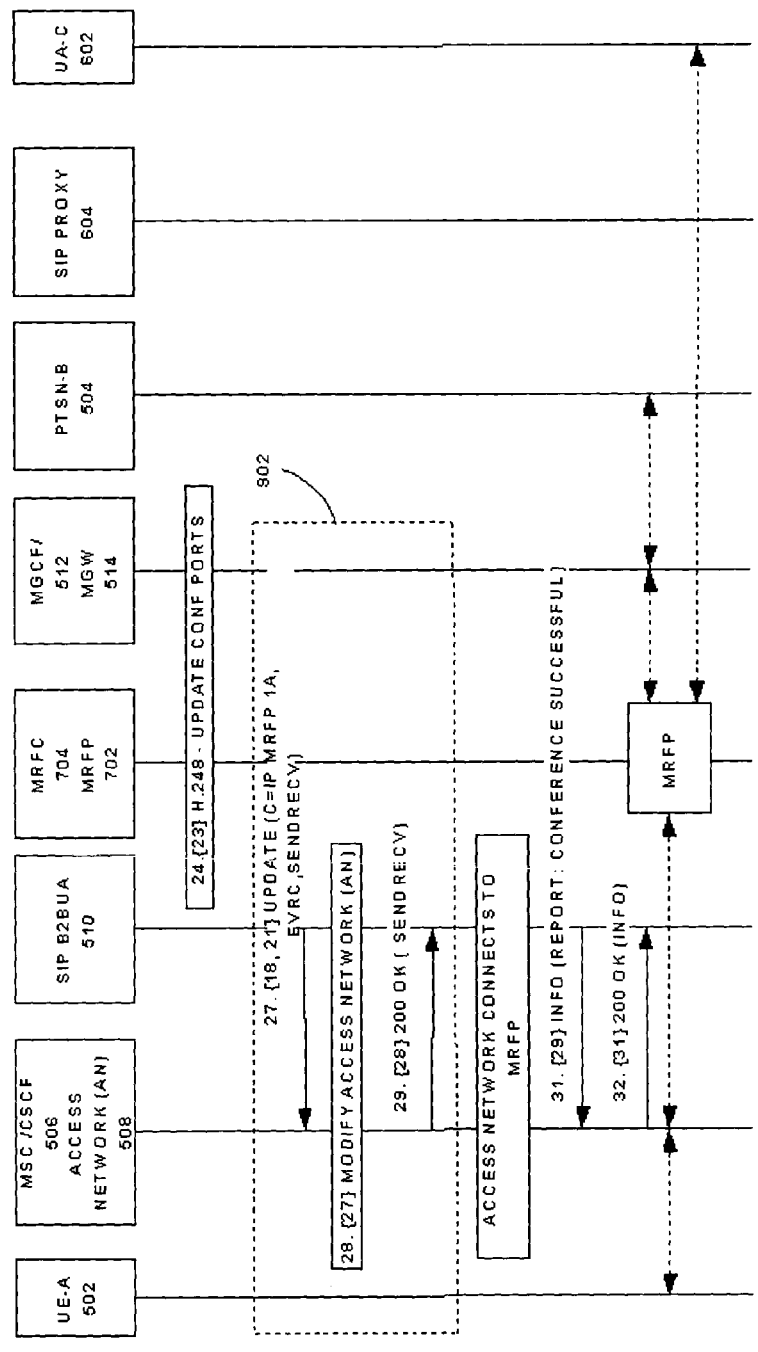

Referring now to FIGS. 8-9, an exemplary method of invoking a conference call is depicted. The UE-A 502 represents an end user that is initially connected with two other users, PSTN-B 504 and the UA-C 602, through respective call legs. The network controller 510 serves as a manager for establishing a conference call between the call legs. The resource controller 702 employs a plurality of codecs and conference ports to serve as a conference bridge for the conference call. The SIP server 506 serves as a translator for call control messages between the UE-A 502 and the network controller 510. The SIP server 506 initially provides a communication path between the UE-A 502 and the PSTN-B 504 through the MGCF/MGW 512, and between the UE-A 502 and the UA-C 602 through the SIP proxy 604.

The end user UE-A 502 is initially engaged in separate calls with the PSTN-B 504 and the UA-C 602, identified by respective call ids. The call to the PSTN-B 504 is initially on hold. The UE-A 502 sends a request for a conference call to the mobile switching center 506. The mobile switching center 506 signals the network controller 510 to build the conference call with the respective call ids of the calls to PSTN-B 504 and UA-C 602 (message 1). Upon receipt of the request, the network controller 510 sends an acknowledgement of the request to the mobile switching center 506 (message 2). The network controller 510 then sends a request (message 9) to the resource controller 702 to allocate one or more network resources 704 for the conference call, for example, one or more transcoders and network ports. In one example, message 9 comprises three separate messages to allocate the one or more network resources 704 for the conference call. The resource controller 702 allocates the one or more network resources 704 and returns control information corresponding to the allocated network resources 704 for each leg of the conference call, for example, internet protocol ("IP") addresses, codecs available, and directionality (message 11). In one example, message 11 comprises an offer message of the available network resources 704 for the conference call.

Upon receipt of the control information from the resource controller 702, the network controller 510 updates the network to re-configure the bearer path. In one example, the network controller 510 performs an end-to-end negotiation with the UE-A 502, the PSTN-B 504, and the UA-C 602. In a further example, the network controller 510 employs an SDP offer/answer model to perform the end-to-end negotiation with the UE-A 502, the PSTN-B 504, and the UA-C 602. For example, the network controller 510 sends the respective conference port, codecs available on the conference port, and the directionality of the conference port to the PSTN-B 504 and the UA-C 602 (messages 16 and 19). The PSTN-B 504 and the UA-C 602 answer the end-to-end negotiation by accepting one of the codecs offered by the network controller 510 (messages 18 and 21). The groupings of messages 802, 804, and 902 in one example comprise an exchange of offer/answer negotiations. Examples of offer/answer negotiations are shown in the patent application identified as Ser. No. 10/295,775, filed Nov. 14, 2002 titled "COMMUNICATION BETWEEN USER AGENTS THROUGH EMPLOYMENT OF CODEC FORMAT UNSUPPORTED BY ONE OF THE USER AGENTS," which has been previously incorporated by reference in this application. In one example, the negotiations of the groupings of messages 802, 804, and 902 occur simultaneously. The PSTN-B 504 and the UA-C 602 connect to the respective conference port using the accepted codec. The network controller 510 signals the resource controller 702 to configure the respective network resources 704 for the call legs according to the accepted codecs received from the PSTN-B 504 and the UA-C 602 (message 23). The network controller 510 then configures the call leg of the UE-A 502 (messages 27 and 29) and acknowledges the successful setup of the conference call (messages 31 and 32).

Figure 10:
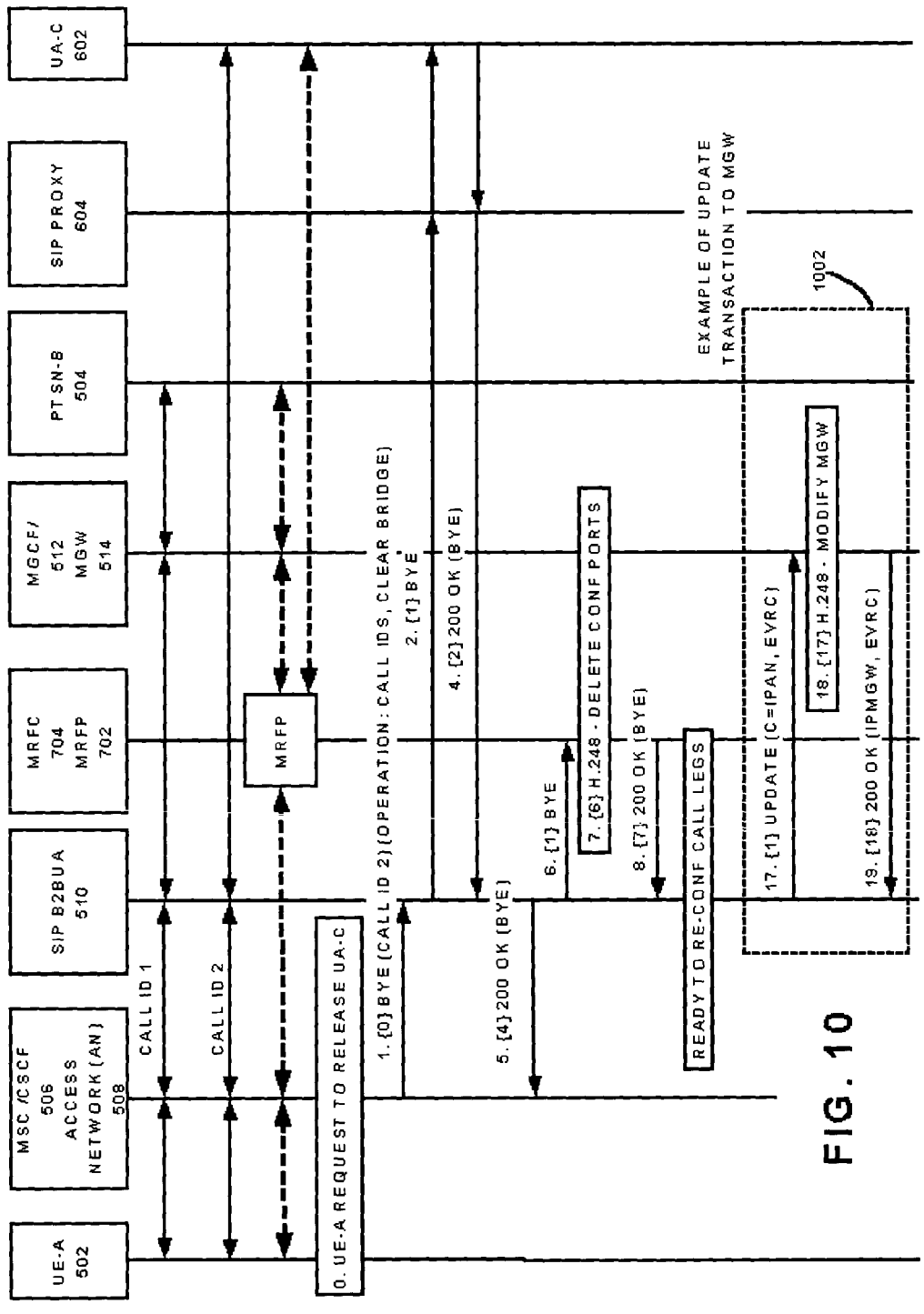
FIGS. 10-11 is another representation of one exemplary request to release operation.
Figure 11:
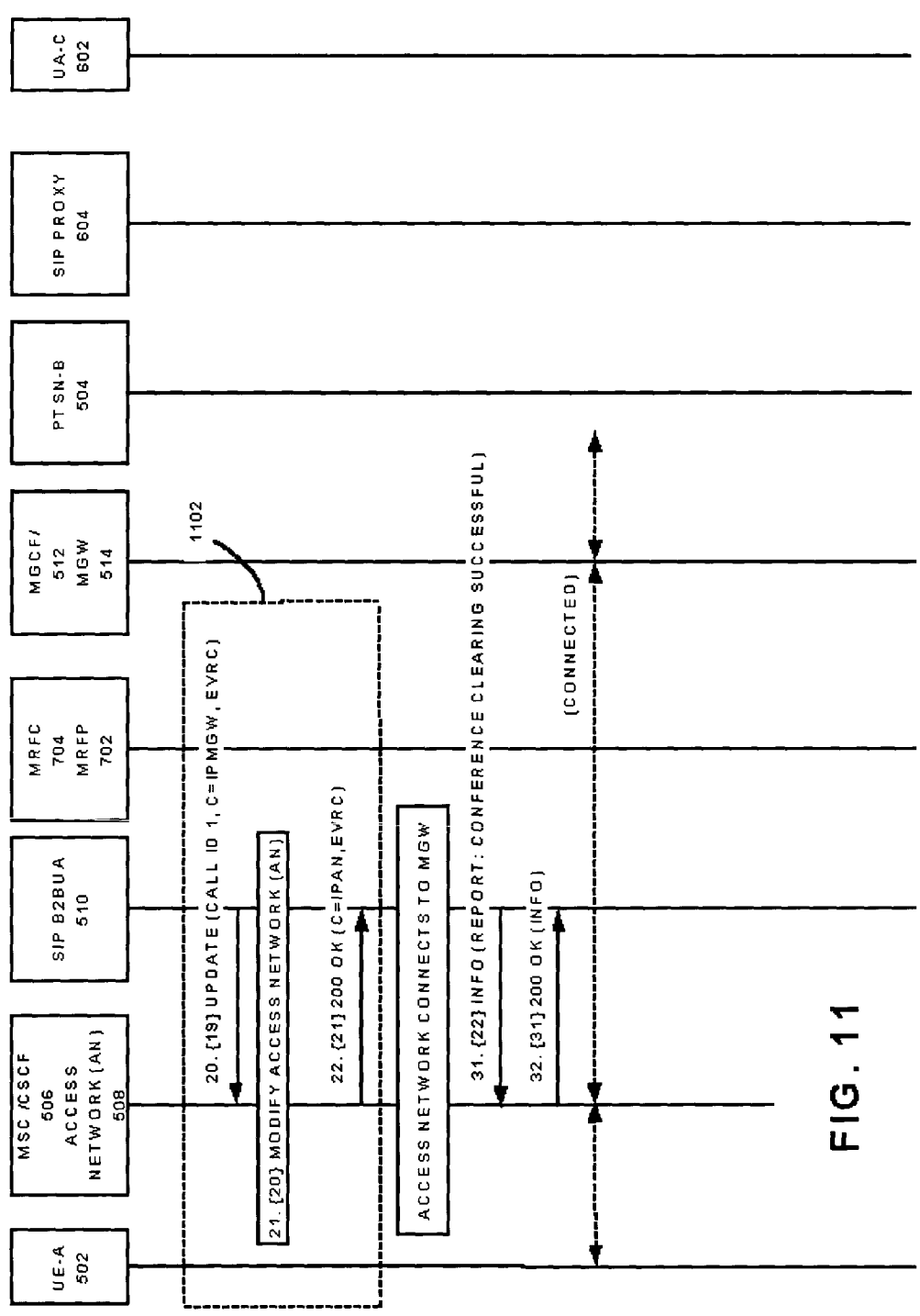
Figure 12:
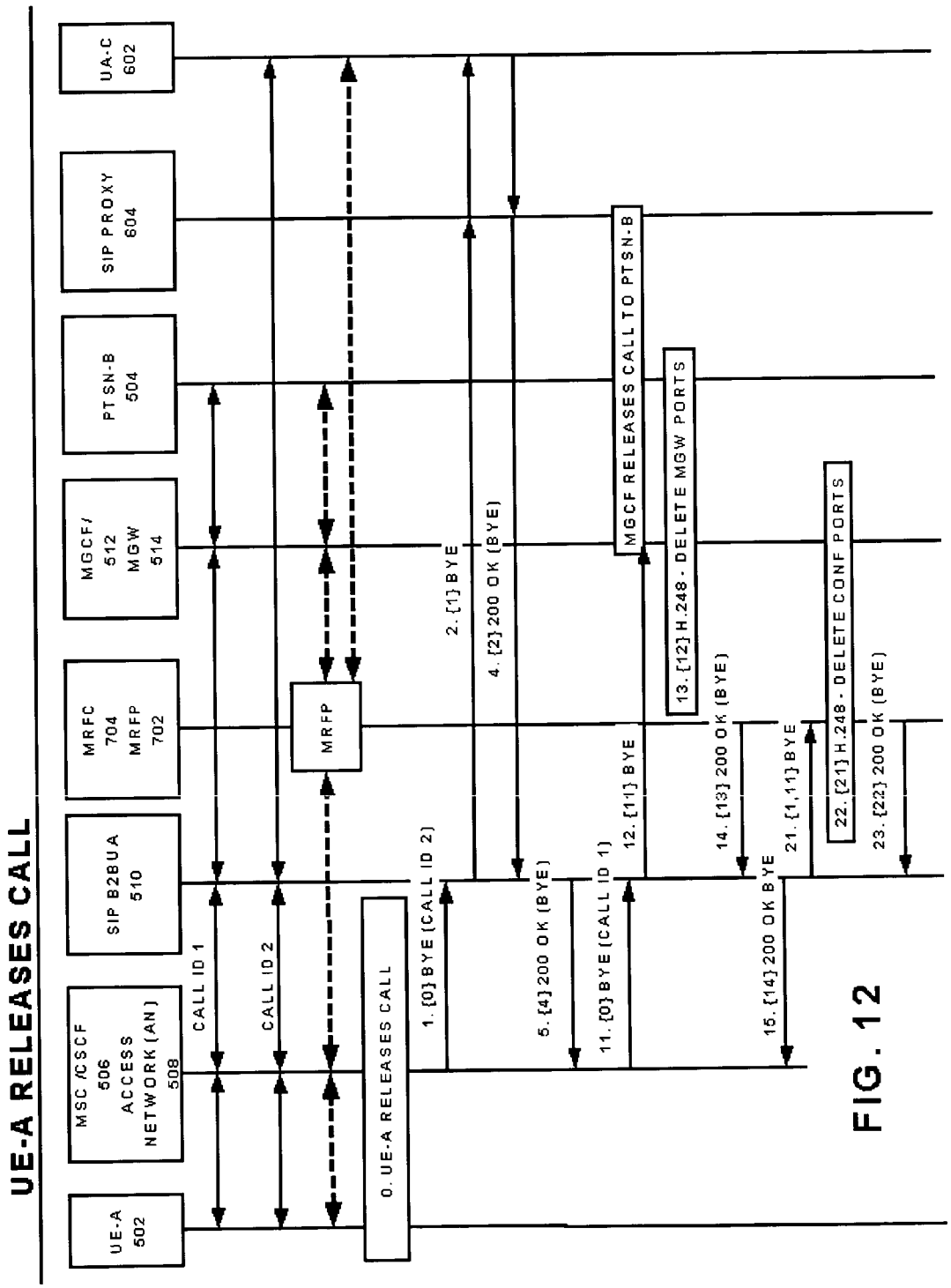
FIG. 12 is another representation of one exemplary release call operation.

Referring now to FIGS. 10-11, exemplary diagrams depict a request to release scenario in the communication network depicted in FIGS. 11-12. The UE-A 502 sends a request to release the UA-C 602 to the MSC/CSCF 506 (message 0). The MSC/CSCF 506 signals the network controller 510 to drop the call identified by the call id that corresponds to the UA-C 602 and to clear the conference bridge (message 1). The network controller 510 signals the UA-C 602 through the SIP proxy 604 to disconnect from the conference call (message 2). The UA-C 602 sends an acknowledgment of the signal to disconnect from the conference call to the network controller 510 (message 4). The network controller 510 then notifies the MSC/CSCF 506 of the successful disconnect of the UA-C 602 from the conference call (message 5). The network controller 510 notifies the resource controller 702 to free the allocated network resources 704 for the conference call (message 6). The resource controller 702 responds by deleting the allocated network resources 704 (message 7) and signaling the network controller 510 to confirm the closing of the conference bridge (message 8). The network controller 510 signals the MGCF/MGW 512 to disconnect from the conference bridge and connect to the MSC/CSCF 506 (message 17). The MGCF/MGW 512 disconnects from the conference bridge and signals the network controller 510 (messages 18 and 19). The network controller 510 then signals the MSC/CSCF 506 to connect to the MGCF/MGW 512 (message 20). The MSC/CSCF 506 disconnects from the conference bridge and connects to the MRFC/MGW 512 (message 21). The MSC/CSCF 506 then acknowledges the signal to connect to the MGCF/MGW 512 (message 22). The groupings of messages 1002 and 1102 in one example comprise an exchange of offer/answer negotiations. Examples of offer/answer negotiations are shown in the patent application identified as Ser. No. 10/295,775, filed Nov. 14, 2002 titled "COMMUNICATION BETWEEN USER AGENTS THROUGH EMPLOYMENT OF CODEC FORMAT UNSUPPORTED BY ONE OF THE USER AGENTS," which has been previously incorporated by reference in this application. In one example, the negotiations of the groupings of messages 1002 and 1102 occur simultaneously. The network controller 510 then sends a confirmation of the successful clearing of the conference bridge to the MSC/CSCF 506 (message 31). The MSC/CSCF 506 returns an acknowledgement of the successful clearing of the conference bridge to the network controller 510 (message 32).

Referring now to FIG. 12, an exemplary diagram depicts a call release scenario by a user UE-A 502 in a communication network that provides a conferencing feature. The UE-A 502 is initially in a conference call with a user PSTN-B 504 and a user UA-C 602. The UE-A 502 sends a signal to release the conference call to the MSC/CSCF 506 (message 0). The MSC/CSCF 506 signals the network controller 510 to release the calls associated with the PSTN-B 504 and the UA-C 602 (messages 1 and 11). The network controller 510 signals the UA-C 602 through the SIP proxy 604 to disconnect from the conference bridge (message 2). After disconnecting from the conference bridge, the UA-C 602 sends a signal to the network controller 510 to acknowledge the disconnect (message 4). The network controller 510 forwards the signal to acknowledge the disconnect of the UA-C 602 to the MSC/CSCF 506 (message 5). The network controller 510 signals the MGCF/MGW 512 to disconnect the call to the PSTN-B 504 (message 12). The MGCF/MGW 512 disconnects the call to the PSTN-B 504, deletes the allocated ports of the media server 514 (message 13), and sends an acknowledgement of the disconnect to the network controller 510 (message 14). The network controller 510 forwards the acknowledgment of the disconnect to the MSC/CSCF 506. The MSC/CSCF 506 sends an acknowledgement of the disconnect of the PSTN-B 504 and the UA-C 602 to the network controller 510 (message 15). The network controller 510 then signals the MRFC/MRFP 702 to free the allocated conference ports (message 21). The MRFC/MRFP 702 frees the allocated conference ports and sends an acknowledgement of the freeing of the ports (messages 22 and 23).

Figure 13:
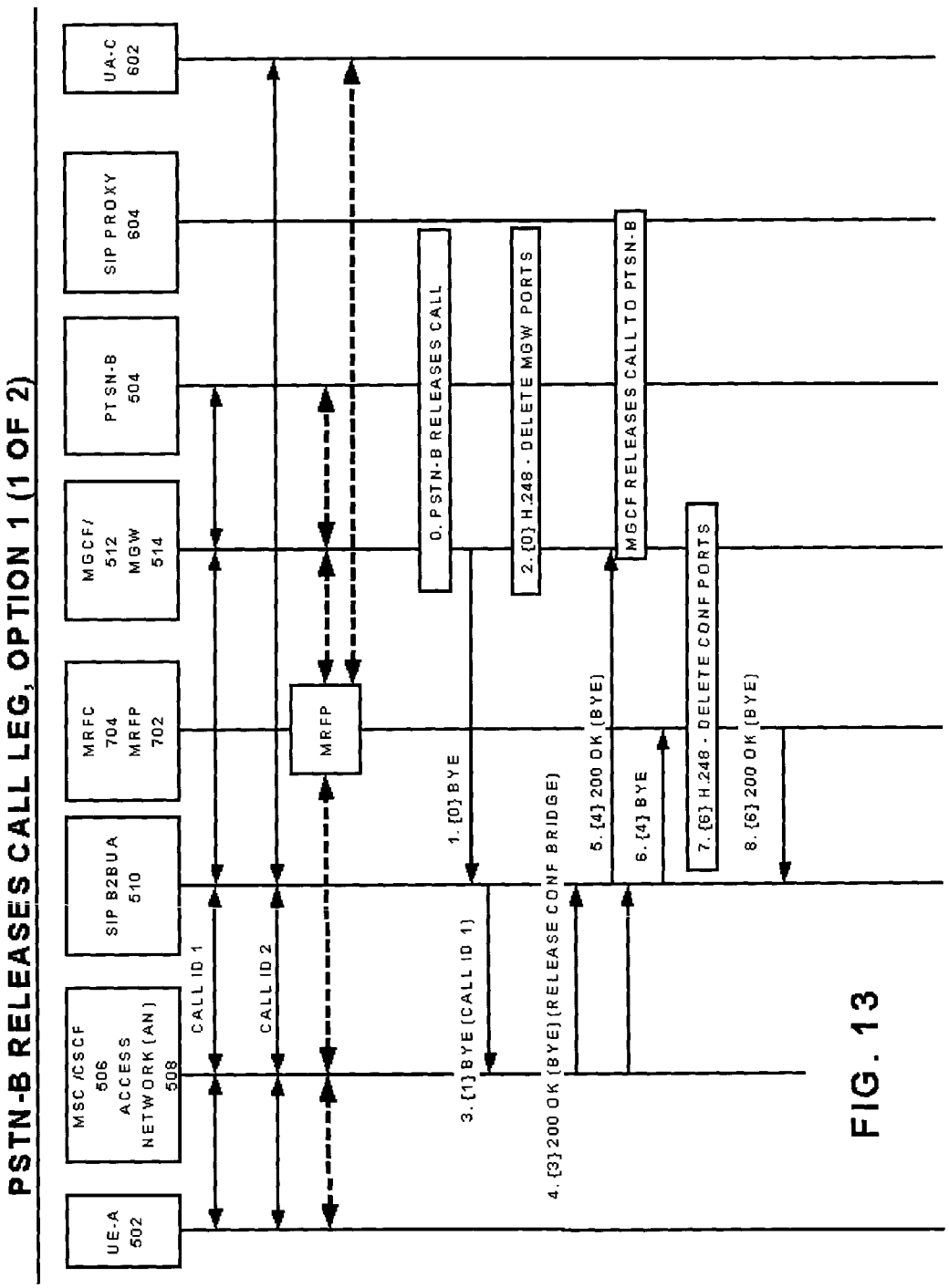
FIGS. 13-14 is a representation of one exemplary optional release operation for a call leg.
Figure 14:
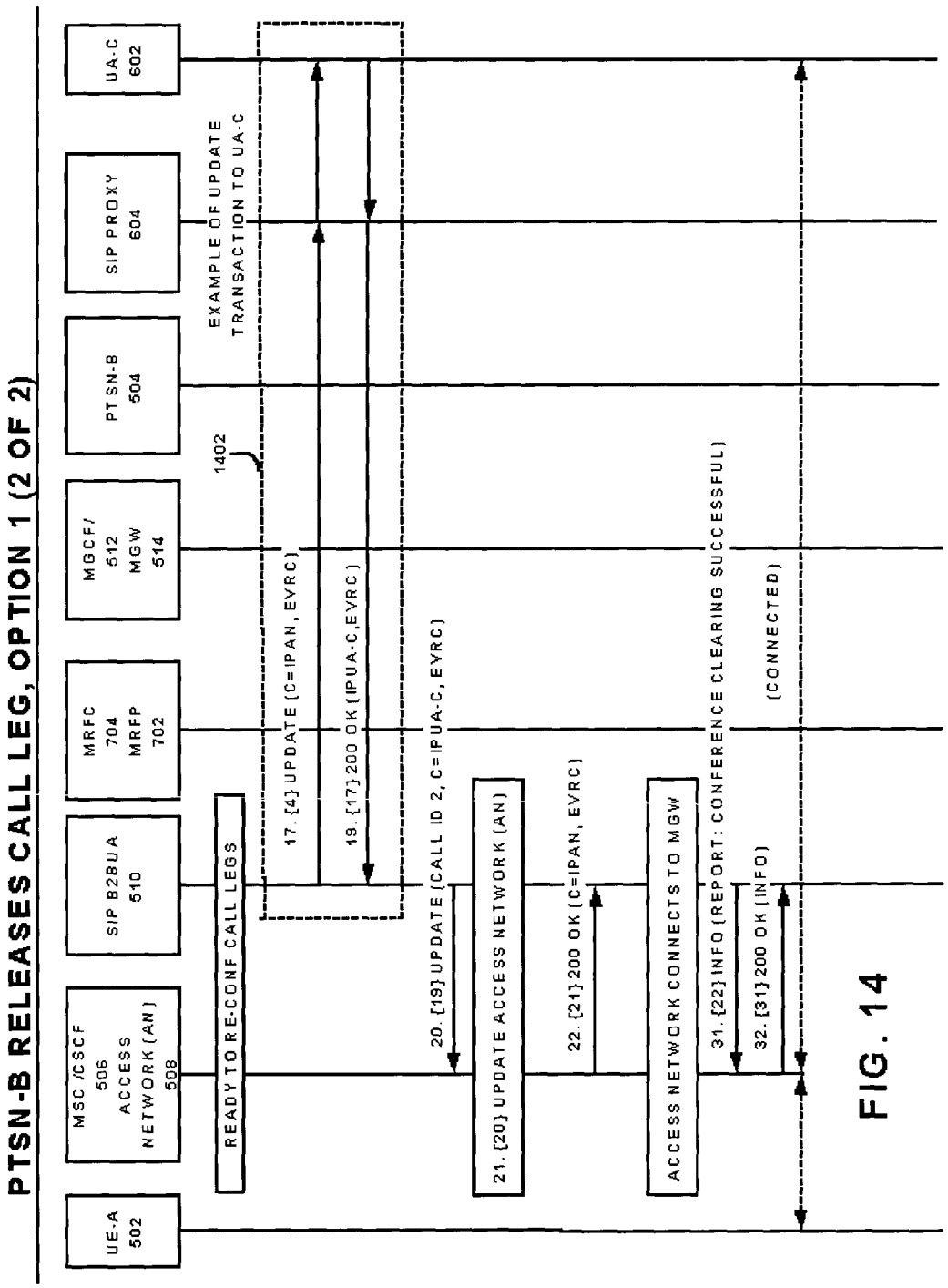

Referring now to FIGS. 13-14, exemplary diagrams depict a release of a call leg scenario by a user PSTN-B 504 in a communication network that provides a conferencing feature. The PSTN-B 504 releases the call (message 0), which causes the MGCF/MGW 512 to signal the network controller 510 of the release (message 1). The network controller then signals the MSC/CSCF 506 of the release of the PSTN-B 504 (message 3). The MSC/CSCF 506 sends an acknowledgement of the release of the PSTN-B 504 to the network controller 510 and signals the MRFC/MRFP 702 to free the allocated conference ports. (message 4). The network controller 510 then forwards the acknowledgement of the release to the MGCF/MGW 512 (message 5). The MRFC/MRFP 702 frees the allocated conference ports and sends an acknowledgement of the freeing of the ports (messages 7 and 8). The network controller 510 updates the UA-C 602 and the MSC/CSCF 506 to connect the UE-A 502 and the UA-C 602 (messages 17, 19, 20-22). The grouping of messages 1402 in one example comprises an exchange of offer/answer negotiations. Examples of offer/answer negotiations are shown in the patent application identified as Ser. No. 10/295,775, filed Nov. 14, 2002 titled "COMMUNICATION BETWEEN USER AGENTS THROUGH EMPLOYMENT OF CODEC FORMAT UNSUPPORTED BY ONE OF THE USER AGENTS," which has been previously incorporated by reference in this application. The network controller 510 sends an acknowledgement of the successful clearing of the conference bridge (message 31). The MSC/CSCF 506 returns an acknowledgement of the clearing to the network controller 510 (message 32).

Figure 15:
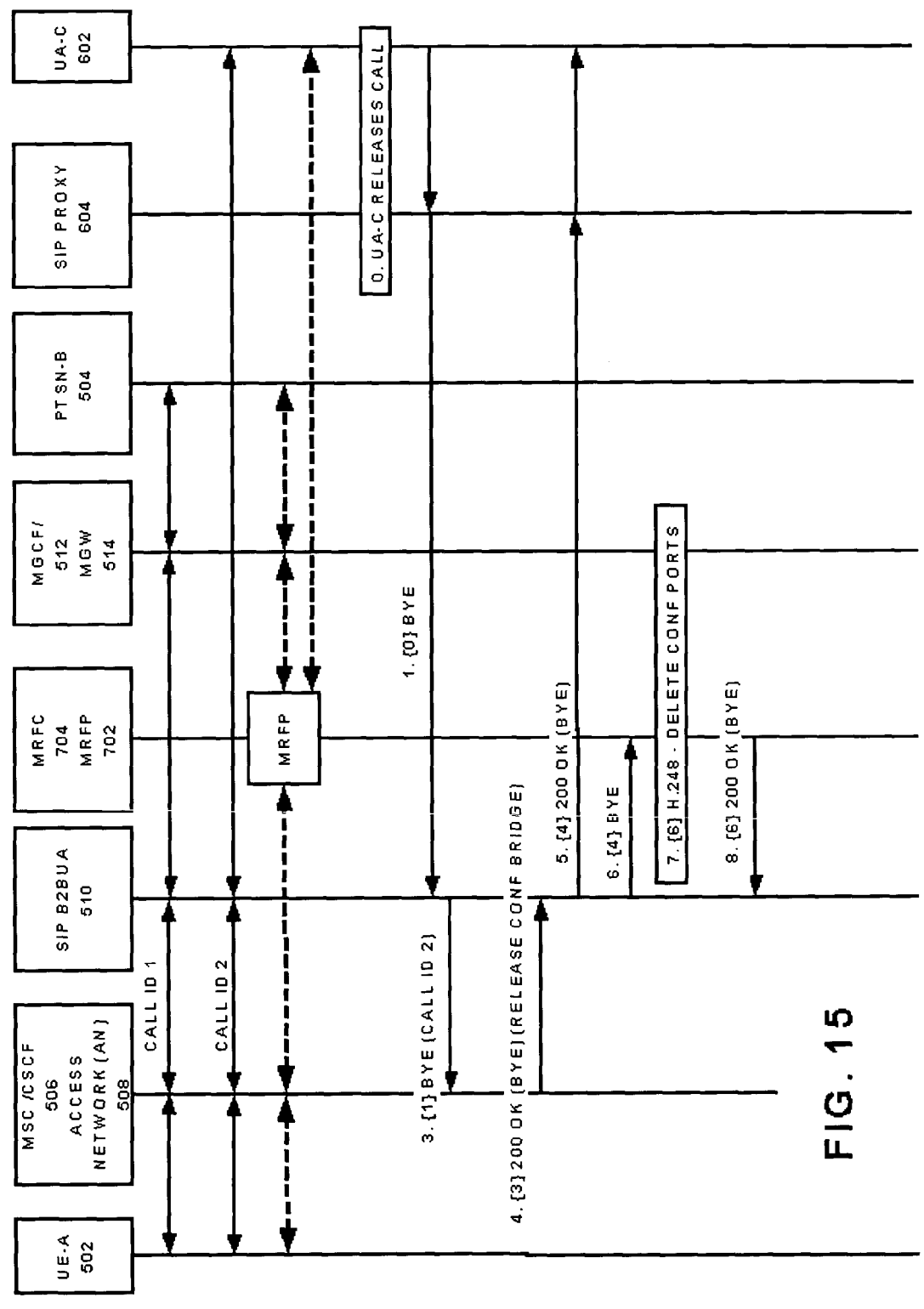
FIGS. 15-16 is another representation of one exemplary optional release operation for a call leg.
Figure 16:
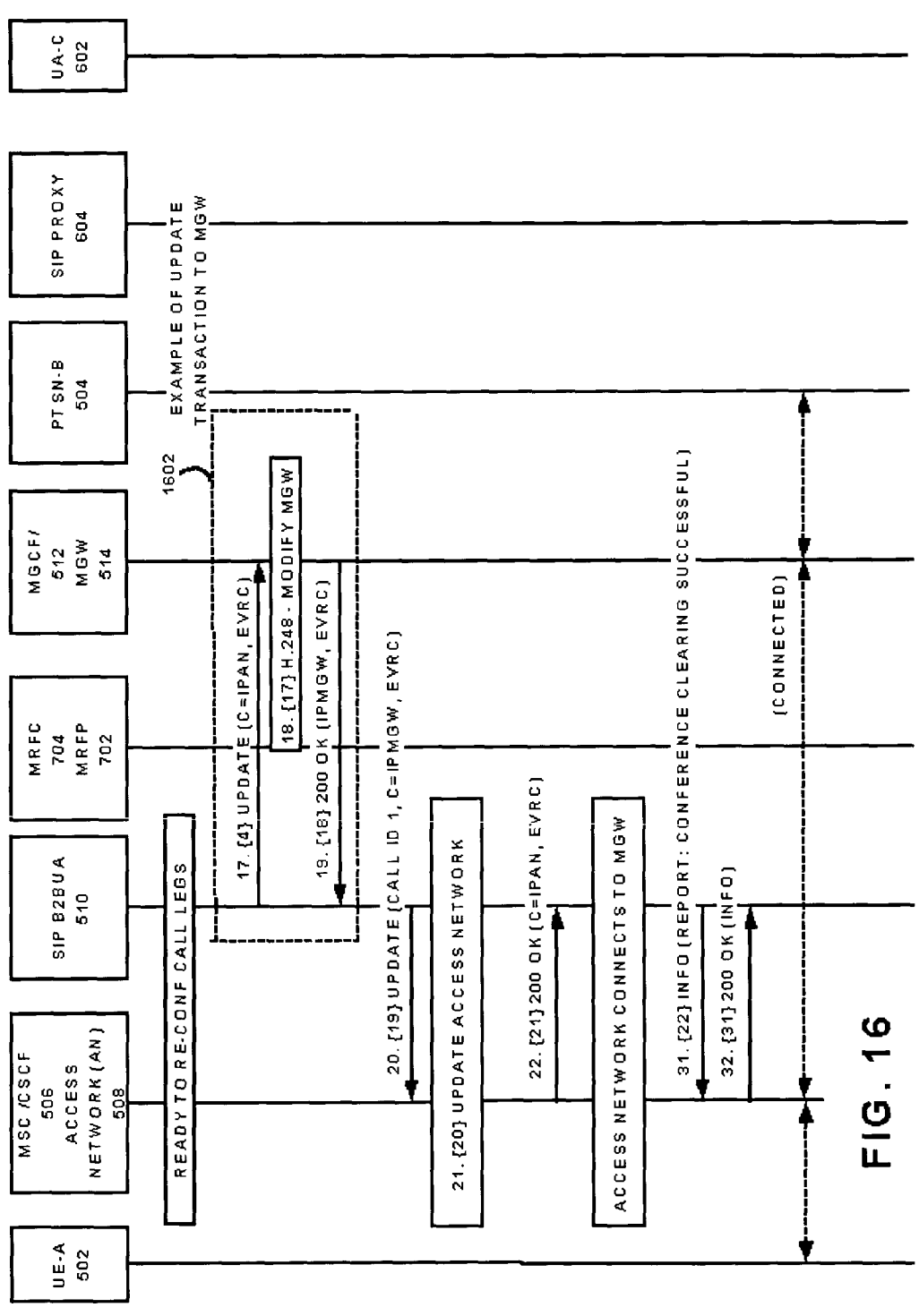

Referring now to FIGS. 15-16, exemplary diagrams depict a release of a call leg scenario by a user UA-C in a communication network that provides a conferencing feature. The UA-C 602 releases the call and sends a signal of the release to the network controller 510 through the SIP proxy 604 (messages 0 and 1). The network controller 510 then signals the MSC/CSCF 506 of the release of the UA-C 604 (message 3). The MSC/CSCF 506 sends an acknowledgement of the release of the UA-C 604 to the network controller 510 and signals the MRFC/MRFP 702 to free the allocated conference ports (messages 4 and 6). The network controller 510 then forwards the acknowledgement of the release to the UA-C 602 through the SIP proxy 604 (message 5). The MRFC/MRFP 702 frees the allocated conference ports and sends an acknowledgement of the freeing of the ports (messages 7 and 8). The network controller 510 updates the MGCF/MGW 512 and the MSC/CSCF 506 to connect the UE-A 502 and the PSTN-B 504 (messages 17-19, 20-22). The grouping of messages 1602 in one example comprises an exchange of offer/answer negotiations. Examples of offer/answer negotiations are shown in the patent application identified as Ser. No. 10/295,775, filed Nov. 14, 2002 titled "COMMUNICATION BETWEEN USER AGENTS THROUGH EMPLOYMENT OF CODEC FORMAT UNSUPPORTED BY ONE OF THE USER AGENTS," which has been previously incorporated by reference in this application. The network controller 510 sends an acknowledgement of the successful clearing of the conference bridge (message 31). The MSC/CSCF 506 returns an acknowledgement of the clearing to the network controller 510 (message 32).

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a network controller operatively coupled to a resource controller via a SIP interface link, the network controller operatively coupled to a first SIP server via a SIP interface link and a SIP conference control interface link;
the network controller operatively coupled to at least one further SIP server via a signaling interface link;
the resource controller operatively coupled to network resources via a predetermined interface link;
the network resources operatively coupled to a first media server via a media interface link;
the first media server operatively coupled to the first end user via a first respective user equipment media interface link; and
the network resources operatively coupled to at least one further media server via a further media interface link;
wherein the network controller and the SIP servers exchange call control information, and wherein the network controller is operatively coupled to the media servers;
wherein the network controller and the resource controller exchange resource control information, the resource controller operatively coupled to network resources;
wherein the network controller employs a session description protocol within SIP to exchange resource control information with the resource controller using third party call control procedures; and
wherein media of a conference call between respective users is communicated over a bearer path between the network controller and the media servers, and wherein the network resources provide media translations between respective users.

2. The apparatus of claim 1, wherein the network controller employs a session description protocol to perform end-to-end negotiation of the network resources through third party call control procedures.

3. The apparatus of claim 1, wherein the network controller, upon a request from a first user that is on an active call, the first user having at least one on-hold call with at least a second user, joins at least the first and second users in the conference call with at least a third user, and wherein the apparatus further comprises a resource controller operatively connected to the network controller via SIP/SDP signaling that allows the resource controller to independently perform at least codec renegotiation and bearer re-configuration for each call leg between users.

4. The apparatus of claim 3, wherein upon a further request from one of the first, second, third users, the network controller clears the conference call thereby disconnecting the at least third user, and restores the active call for two-way conversation between the first and second users.

5. The apparatus of claim 3, wherein a respective user is operatively connected to a respective SIP server, and wherein the respective SIP server is operatively connected to the network controller via SIP/SDP signaling.

6. The apparatus of claim 3, wherein the network controller maintains previous call information associated with respective users during the conference call.

7. The apparatus of claim 6, wherein the call information includes at least one of end-point codec capabilities and call identifications.

8. The apparatus of claim 3, wherein after the network resources are set up by the resource controller, the network controller outputs update information simultaneously to each user to re-configure bearer.

9. The apparatus of claim 8, wherein the update information includes at least send/receive IP (Internet Protocol) address, port number, and codec information.

10. An apparatus, comprising:
a network controller that, upon a request from a first user equipment that is on an active call, the first user equipment having at least one on-hold call with at least a second user equipment, joins at least the first and second users equipment in a conference call with at least a third user equipment;
the network controller operatively coupled to a resource controller via a SIP interface link, the network controller operatively coupled to a first SIP server via a SIP interface link and a SIP conference control interface link;
the network controller operatively coupled to at least one further SIP server via a signaling interface link;
the resource controller operatively coupled to network resources via a predetermined interface link;
the network resources operatively coupled to a first media server via a media interface link;
the first media server operatively coupled to the first end user equipment via a first respective user equipment media interface link; and
the network resources operatively coupled to at least one further media server via a further media interface link;
wherein the network controller translates call control information between a plurality of protocols employed by a plurality of respective communication links for the first, second and third users in the conference call, and wherein a plurality of codecs and conference ports serve as a conference bridge for the conference call;
wherein the network controller and the SIP servers exchange call control information, and wherein the network controller is operatively coupled to the media servers;
wherein the network controller and the resource controller exchange resource control information, the resource controller operatively coupled to network resources;
wherein the network controller employs a session description protocol within SIP to exchange resource control information with the resource controller using third party call control procedures; and
wherein media of a conference call between respective users equipment is communicated over a bearer path between the network controller and the media servers, and wherein the network resources provide media translations between respective users equipment.

11. The apparatus of claim 10, wherein upon a further request from one of the first, second, third users, the network controller clears the conference call thereby disconnecting the at least third user, and restores the active call for two-way conversation between the first and second users.

12. The apparatus of claim 10, wherein a respective user is operatively connected to a respective SIP server, and wherein the respective SIP server is operatively connected to the network controller via SIP/SDP signaling.

13. The apparatus of claim 10, wherein the network controller maintains previous call information associated with respective users during the conference call.

14. The apparatus of claim 13, wherein the call information includes at least one of end-point codec capabilities and call identifications.

15. The apparatus of claim 10, wherein after network resources are set up by the resource controller, the network controller outputs update information simultaneously to each user to re-configure bearer.

16. The apparatus of claim 15, wherein the update information includes at least send/receive IP (Internet Protocol) address, port number, and codec information.

17. An apparatus, comprising:
- a network controller operatively coupled to a resource controller via a SIP interface link, the network controller operatively coupled to a first SIP server via a SIP interface link and a SIP conference control interface link;
- the first SIP server operatively coupled to a first user equipment via a user equipment signaling interface link and a user equipment conference control link;
- the network controller operatively coupled to at least one further SIP server via a signaling interface link;
- the at least one further SIP server operatively coupled to at least one further end user via a further respective user equipment signaling interface link;
- the resource controller operatively coupled to network resources via a predetermined interface link;
- the network resources operatively coupled to a first media server via a media interface link;
- the first media server operatively coupled to the first end user via a first respective user equipment media interface link, and the first media server operatively coupled to the first SIP server via a first media control interface;
- the first media server operatively coupled to the first end user via a first respective user equipment media interface link;
- the network resources operatively coupled to at least one further media server via a further media interface link; and
- the at least one further media server operatively coupled to at least one further end user via at least one further respective user equipment media interface link, and the at least one further media server operatively coupled to the at least one further SIP server via at least one further media control interface link;
- wherein the network controller and the SIP servers exchange call control information;
- wherein the network controller and the resource controller exchange resource control information;
- wherein the network controller employs a session description protocol within SIP to exchange resource control information with the resource controller using third party call control procedures; and
- wherein media of a conference call between respective users is communicated over a bearer path between the network controller and the media servers, and wherein the network resources provide media translations between respective user equipment.

18. The apparatus of claim 17, wherein the predetermined interface link between resource controller and the network resources is an H.248 interface.

* * * * *